Patented June 8, 1926.

1,588,383

UNITED STATES PATENT OFFICE.

HERMAN FLECK, OF GOLDEN, COLORADO, ASSIGNOR TO WILLIAM A. J. BELL, OF DENVER, COLORADO.

ART OF EXTRACTING RADIUM FROM RADIUM-BARIUM SALTS AND THE LIKE.

No Drawing. Application filed August 15, 1922. Serial No. 582,089.

This invention relates to the extraction of radium values from radium-barium salts such as sulfates, chlorides, bromides, et cetera and is intended to cheapen and expedite the recovery of radium compounds by effecting economies of time, labor and material.

Heretofore it has been the practice to convert the relatively insoluble sulfates of radium and barium into soluble compounds such as chlorides and then follow a process of separating the radium from the barium by boiling these salts in water which operation is continued until the solution reaches the desired stage of crystallization when the solution is allowed to cool with the consequent formation of radium barium salts in crystalline form in which the radium occurs in a higher ratio than found in the salts before such treatment. This method of extraction or concentration by differential crystallization is very slow, laborious and expensive, and is not applicable to salts where the ratio of the radium to the barium content is extremely low.

The process herein described is based on the discovery made by me that it is possible to effect such separation of the radium content from the barium present by putting the radium barium salts into solution by means of a solvent reagent that has a greater or preferential solvent action upon the radium content than it has upon the barium compound present.

There are two great advantages gained by the application of this differential solution process. First, it makes it possible to treat for recovery radium barium salts of such low ratio of radium content to the barium content that they are not commercially workable by the crystallization process and secondly the differential solution process is vastly more economical in time, labor and material.

It is not of course possible to now name all the reagents which are available for use in practicing such a process of differential solution but I have found in practice that oxalic acid forms a very satisfactory reagent for this purpose since I have discovered that it has a marked differential solvent action upon the radium barium salts favorable to the extraction or concentration of the radium content, which I have taken advantage of in the following manner.

I may take a radium barium salt such as radium barium sulfate, radium barium chloride, bromide or the like and to every 5 parts of such salt add say for example 20 parts of oxalic acid and 20 parts of water, preferably distilled water free from sulfate, and boil and stir the mixture for 30 minutes more or less, the amounts stated being illustrative and not prescriptive. The hot solution is then run off through a filter and the filtrate is diluted by the addition of say approximately 600 parts more of water.

The diluted filtrate is allowed to stand for a sufficient period to permit the radium content to precipitate. Such precipitation is hastened by the addition of a preferably small quantity of sulfuric acid, with the consequent deposit of the radium-barium content as a radium barium sulfate. The liquid is then drawn off through a filter and may be treated by evaporation and crystallization to recover the oxalic acid content for further use.

The precipitate will be found to contain a very much higher ratio of radium to barium than did the original salt from which it was obtained and is amenable to a repetition of the same process to effect an even higher degree of concentration, the process being repeated as many times as may be necessary to secure the desired concentration. Instead of repeating the differential solution process it may be practical or advantageous to continue the further extraction of radium by the crystallization method after the radium barium salt has been brought to such a ratio of radium to barium by the present process that it can be profitably extracted by the crystallization process.

Going back now to the original oxalic acid boiling tanks from which the liquor containing radium barium compounds in solution has been filtered off, as above described, we shall find a residue or tailing containing some radium barium content in which of course the ratio of radium to barium is much diminished. This residue may then be subjected to precisely the same processing a second time and in fact as many times as its radium content makes it worth while to treat it.

The above process of differential solution depends therefore upon the selective or preferential solvent action of the solvent reagent upon the radium and thus by an easy method of manipulation results in facilitating separation of radium and barium to produce a higher radium concentrate. It is applicable both to treatment of a radium barium salt per se and to such a salt when mingled with other foreign material.

What I claim is:

1. The improvement in the art of extracting or concentrating the radium content from a radium barium salt, which consists in treating such salt with a solvent reagent having a solvent action upon the radium content in preference to the barium content and separating the solution from the residue by any suitable method such as filtration.

2. The improvement in the art of extracting or concentrating the radium content from a radium barium salt, which consists in subjecting said salt to the solvent action of oxalic acid, thereby producing a solution of values in which the ratio of radium to barium content is materially greater than their ratio in the original salt so treated.

3. The improvement in the art of extracting or concentrating the radium content from a radium barium salt, which consists in boiling the salt with a strong solution of oxalic acid and carrying off in solution the radium content in a substantially higher ratio than the radium to barium ratio in the salt so treated.

4. The improvement in the art of concentrating the radium content of a radium-barium salt which consists in first putting the radium-barium salt into solution by means of a chemical reagent having a relatively greater solvent action on the radium content than on the barium content, filtering off the solution containing the radium and barium values so dissolved and precipitating therefrom the radium content, thereby securing a precipitate in which the ratio of radium content to the barium content is higher than the radium-barium ratio of the salt before treatment, substantially as described.

In witness whereof, I have subscribed the above specification.

HERMAN FLECK.